Aug. 19, 1930.   F. P. SERVAIS   1,773,502
BUMPER
Filed July 26, 1929

INVENTOR
FRANK P. SERVAIS.
BY
ATTORNEY

Patented Aug. 19, 1930

1,773,502

UNITED STATES PATENT OFFICE

FRANK P. SERVAIS, OF DETROIT, MICHIGAN, ASSIGNOR TO CHRYSLER CORPORATION, OF DETROIT, MICHIGAN, A CORPORATION OF DELAWARE

BUMPER

Application filed July 26, 1929. Serial No. 381,192.

This invention relates to bumpers for motor vehicles.

The main objects of this invention are to provide an improved form of stream line bumper which will create a minimum of disturbance in the air streams at the front of an automobile; to provide a bumper which will reduce the resistance to a minimum when projected through the air at high speeds and to provide means mounted in advance of the front end of a motor car for splitting the air streams without causing substantial turbulence therein.

An illustrative embodiment of this invention is shown in the accompanying drawings in which.

Figure 1:
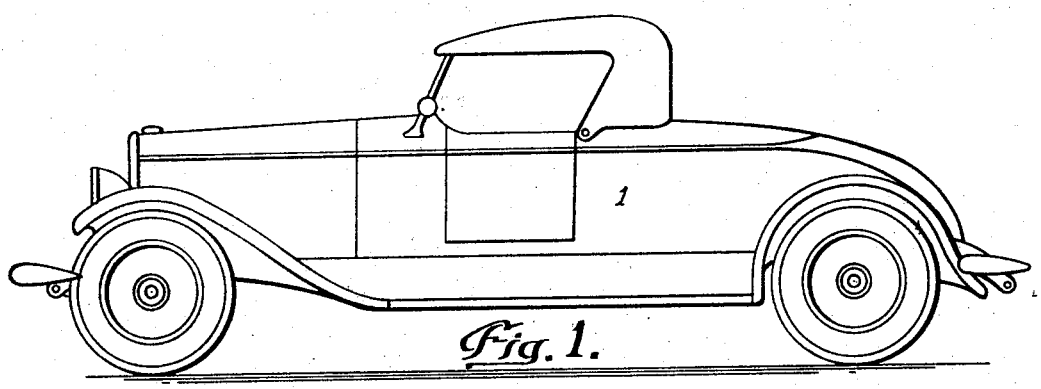
Fig. 1 is a view in side elevation of a motor car equipped with the improved bumper.

In the construction of modern motor cars, practically every car is equipped and provided with a bumper which is mounted on brackets at, and in advance of, the front end of the car. Practically all of these bumpers are made of flat spring steel strips and are mounted with the flat surface thereof in a vertical plane. Such bumpers are designed strictly from the utilitarian stand-point, and the matter of resistance to air flow has been totally ignored.

By careful experimentation conducted in wind tunnel tests it has been definitely determined that slight disturbances in the stream line flow of air at the front end of an elongated body, which cause turbulency in the flow of air, will very materially detract from the efficiency of the structure from a resistance standpoint.

In the construction shown in the drawings, the frame of an automobile 1 is shown provided at its front end with a pair of forwardly projecting brackets 2 and 3, the rear ends of which are secured to the chassis side frames 4 and 5 respectively. The front ends of the brackets 2 and 3 surround and support a horizontally disposed bumper bar 6 which has ends 7 and 8 curved rearwardly in the same direction and plane.

The bumper bar 6 with its curved ends is shaped so as to be of true stream line cross section at all points of vertical sections taken at right angles to the longitudinal axis of the straight portion of the bumper bar which is disposed between its supporting brackets.

Figure 4:
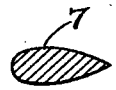
Fig. 4 is a sectional view taken on the line 4—4 of Fig. 2.
Figure 5:
Fig. 5 is a sectional view taken on the line 5—5 of Fig. 2.

This stream line shape of the bar is preferably of a fineness ratio of about 3.5:1, and if it is so desired this same ratio may be retained for the entire bar. When this is the case, the rearwardly curved ends 7 and 8 will necessarily have a greater thickness than the medial portion of the bar as it will be apparent that the length of a section taken through these curved ends as shown in Fig. 4 will be greater than the length of a section taken through the straight portion of the bar as shown in Fig. 5.

In the use of this improved bumper, it is mounted at, and in advance of, the front end of the motor vehicle and when thus positioned will perform the customary function of protecting the front end of the vehicle. When the vehicle is being driven forwardly, the bumper itself will present comparatively little resistance to the air and at the same time perform the further useful function of splitting the air streams without causing substantial turbulency therein so that the air streams will pass rearwardly to the car in substantially unbroken and undisturbed flow.

Figure 2:
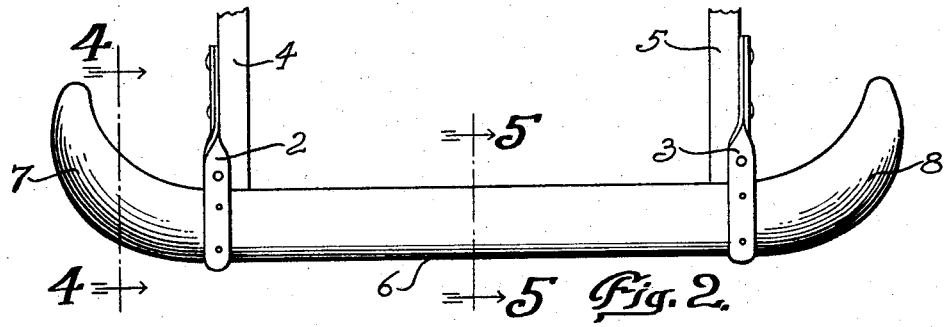
Fig. 2 is a top plan view of the bumper attached to fragmentary front ends of a chassis frame.
Figure 3:
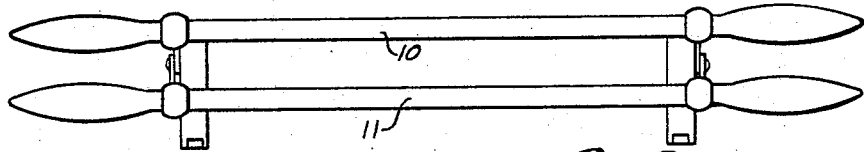
Fig. 3 is a view in front elevation of a double bar bumper embodying the new improvements.

In the embodiment shown in Fig. 3 of the drawings, a pair of horizontally disposed bars 10 and 11 are mounted in vertically spaced parallel relation to each other. These bars are each of substantially the same conformation as the single bar illustrated in Figs. 1 and 2.

Although but one specific embodiment and one modification thereof have been herein shown and described it is to be understood that numerous details of the constructions shown may be altered or omitted without departing from the spirit of this invention as defined by the following claims.

I claim:

1. A bumper for motor vehicles having a cross section of substantially stream-line shape.

2. A bumper for motor vehicles comprising a horizontally disposed member having the ends thereof curved in the same direction and plane, said bumper being of stream-line shape at all points of vertical cross sections taken at right angles to the longitudinal axis of the straight portion of said horizontally disposed member.

3. The combination of a motor vehicle and means mounted on the front end of said vehicle and in advance thereof of substantially stream-line shape for splitting the air streams without causing substantial turbulence therein.

4. The combination of a motor vehicle and a stream-line bumper having a cross section of substantially stream-line shape mounted on the front end of said vehicle and in advance thereof for splitting the air streams without causing substantial turbulence therein.

5. The combination of a motor vehicle and a horizontally disposed member mounted on and in spaced relation to the front end of said vehicle, said member being of stream-line shape in vertical cross section for splitting the air streams without causing substantial turbulence therein.

6. A bumper for motor vehicles having a cross section of substantially stream-line shape throughout its length, said bumper varying in cross sectional area.

7. A bumper for motor vehicles having an irregular outline and a cross section of substantially stream-line shape throughout its length, said bumper varying in cross sectional area.

8. A bumper for motor vehicles having an irregular outline and a cross section of substantially stream-line shape and having a uniform fineness ratio.

9. The combination of a motor vehicle and means mounted on the front end of said vehicle and in advance thereof of substantially stream-line shape having a uniform fineness ratio throughout its length.

10. A bar having an irregular outline and a cross section of substantially stream-line shape throughout its length and having a uniform fineness ratio.

FRANK P. SERVAIS.